United States Patent [19]

Fowlkes, Jr.

[11] Patent Number: 5,141,437
[45] Date of Patent: Aug. 25, 1992

[54] ADJUSTABLE FURNITURE LAYOUTS

[76] Inventor: Vinson G. Fowlkes, Jr., 329 Ueland Rd., Middletown, Red Bank Mail, N.J. 07701

[21] Appl. No.: 644,493

[22] Filed: Jan. 23, 1991

Related U.S. Application Data

[63] Continuation of Ser. No. 477,740, Feb. 9, 1990, Pat. No. 5,015,190.

[51] Int. Cl.⁵ .............................................. G09B 29/00
[52] U.S. Cl. ........................................ 434/72; 434/80
[58] Field of Search ............................. 434/80, 79, 72

[56] References Cited

U.S. PATENT DOCUMENTS

| | | |
|---|---|---|
| 2,293,441 | 8/1942 | Meyer . |
| 2,405,808 | 8/1946 | Armbright . |
| 2,878,586 | 3/1959 | Ohlsson . |
| 2,984,020 | 5/1961 | Levitas . |
| 3,012,336 | 12/1961 | Brown . |
| 4,250,642 | 2/1981 | Riehle . |
| 4,652,239 | 3/1987 | Brimberg . |
| 4,806,102 | 2/1989 | Pederson . |

OTHER PUBLICATIONS

"Cut-Outs", US Dept. of Agriculture Misc. Publication No. 622; pp. 1-47, 1947.

*Primary Examiner*—Richard J. Apley
*Assistant Examiner*—Glenn Richman
*Attorney, Agent, or Firm*—William H. Murray; Frank M. Linguiti

[57] ABSTRACT

Apparatus is provided for planning the design of a region and the positioning of objects in the region. A first layout having a first layout area is disposed in the region to represent placement of an object such as an article of furniture within the region in a pre-determined relationship with the region. A second layout having a second layout area is disposed in combination with the first layout to form a layout combination having a combined layout area. The combined layout area is adjusted in accordance with the dimensions of the object being represented. In order to adjust the combined layout area one layout may be disposed over a portion of the other layout. The combined area of the two layouts can be adjusted by adjusting the amount of area of one layout disposed over the other. Additionally, the combined area can be adjusted by folding or cutting at least one of the two layouts.

10 Claims, 8 Drawing Sheets

ADJUSTABLE FURNITURE LAYOUTS

This is a continuation of copending application(s) Ser. No. 07/477,740 filed on Feb. 09, 1990, now U.S. Pat. No. 5,015,190.

BACKGROUND OF THE INVENTION

This invention relates to a demonstration layout planner adapted for use in demonstrating and facilitating the layouts of equipment, articles of furniture and the like, in a room of definite dimensions, so that a lay person can readily visualize the precise arrangement and location that such articles will occupy when installed or set in place in such a room. The modernization of kitchens and other rooms, for example, playrooms, in a home, with standard equipment and articles of furniture is at the present time proceeding at an accelerated rate. Kitchen equipment and articles of furniture for such purposes are now being manufactured in units of various sizes and packaged for direct shipment to the purchaser who, independently of, or with the aid of a salesperson, chooses and orders the desired equipment.

In a home setting, as well as in a commercial setting, it is difficult to visualize how the pieces of furniture or equipment will appear in a given room. The esthetic appearance of one furniture layout as compared with another is hard to visualize. This difficulty makes the decoration and arrangement of furniture within the home or commercial setting difficult and time consuming. In a commercial setting, the functional relationship of furniture and office equipment are difficult to determine without a layout of these pieces.

In the home, visualization of a furniture layout may be obtained by laborious rearrangement of the present furniture. A greater problem is presented when new pieces of furniture have to be added to an already decorated room. Alternatively, a draftsman may draw a proposed layout sketch illustrating either a plan or a perspective view of the arrangement of pieces. However, it is difficult to readily rearrange the drawn pieces without making a completely new sketch. As a result, a large number of hours may be spent in providing a number of sketches until a modular layout that is acceptable from a functional or aesthetic point of view is realized.

A more practical solution is the use of modules that may be readily rearranged upon a layout board. If the placement of a furniture module is not aesthetically appealing or functional, it may be readily moved to other locations until the right placement is found for the piece of furniture or equipment. To be effective, these modules must be active and realistic so that the final layout may simulate in a manner as closely as possible, the actual appearance of the room.

Schwieger U.S. Pat. No. 2,941,314, discloses a display case having two sections in which are fixedly disposed plates. A grid-like sheet is disposed over each plate and a set of furniture modules may be arranged upon the plates in the desired room arrangement. In particular, the plates may be made of a ferrous metal. Each of the furniture modules includes a permanent magnet whereby the module may be attached to the plate. Each section of the display case is connected to the other by a hinge, whereby the sections may be closed on each other and secured by a catch. Since each plate is fixedly secured to each section, the hinges are designed so that they may be separated to permit the removal of one section along with the plan and models so that it can be easily carried to and compared with different locations of the room to be arranged. The sections when closed and locked by the catch form a carrying case While these sections are portable and permit the visualization of possible layouts of a room, the furniture modules are relatively expensive to produce and are of a fixed size thereby preventing a module from representing pieces of furniture of varying sizes.

D'Agrosa U.S. Pat. No. 3,659,353 discloses a method of preparing a modular layout, whereby a sheet made of a magnetically attractive material is provided for receiving and supporting magnetic permeable material Sets of lines are disposed on the sheet to define the grid, whereby a plurality of modules resembling furniture may be arranged on the grid. However, the modules for representing furniture are relatively expensive and are of a fixed size thereby preventing them from representing articles of furniture of varying sizes.

It is therefore the object of the invention to provide adjustable layouts for aiding in the visualization of arrangements of objects in a space wherein the layouts may be used to represent objects of varying size.

SUMMARY OF THE INVENTION

Apparatus is provided for planning the design of a region and the positioning of objects in the region A first layout having a first layout area is disposed in the region to represent placement of an object such as an article of furniture within the region in a pre-determined relationship with the region. A second layout having a second layout area is disposed in combination with the first layout to form a layout combination having a combined layout area. The combined layout area is adjusted in accordance with the dimensions of the object.

DETAILED DESCRIPTION OF THE INVENTION

Figure 1A:
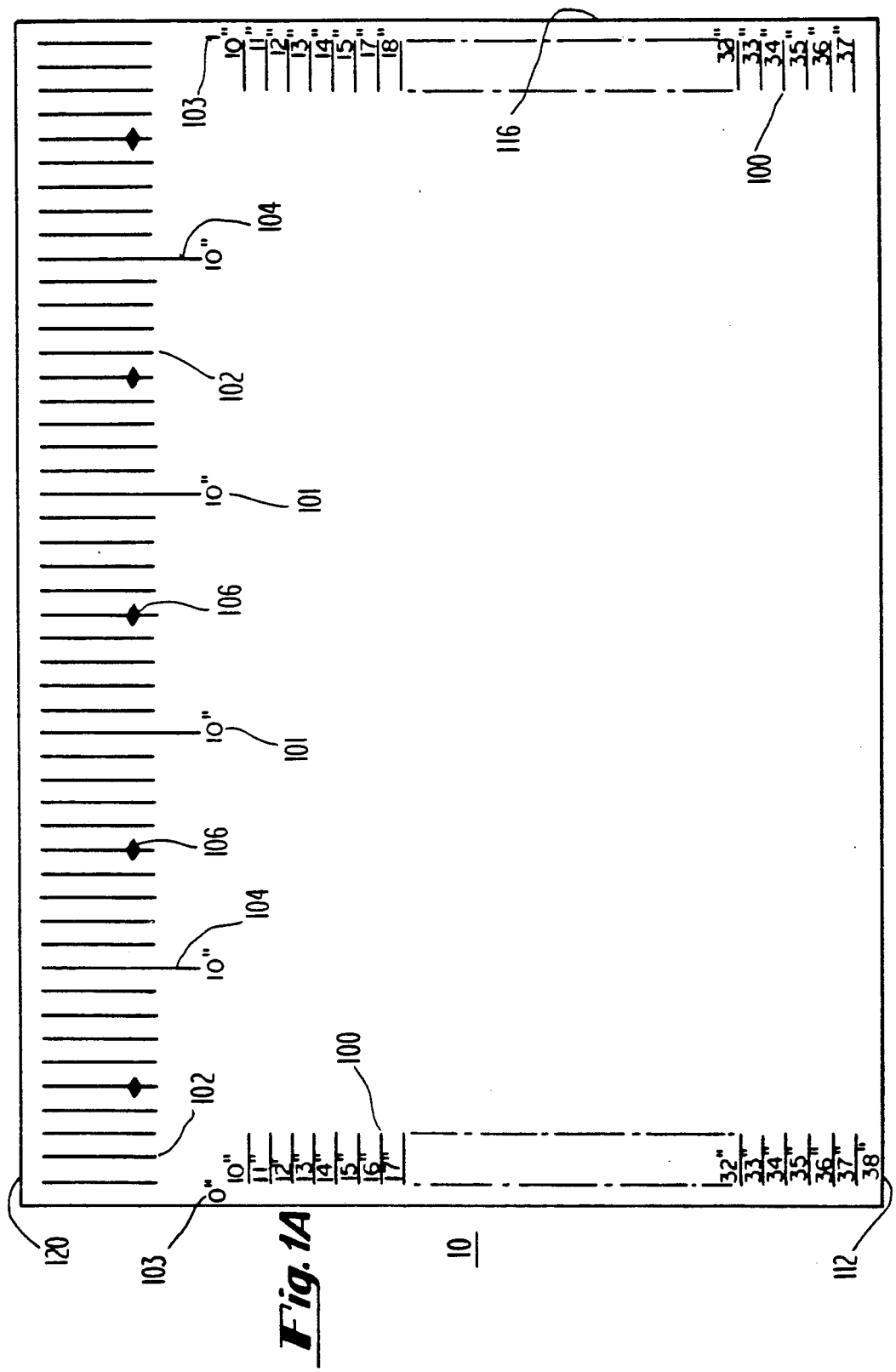
FIGS. 1A-1D show the adjustable layouts of the present invention.
Figure 1B:
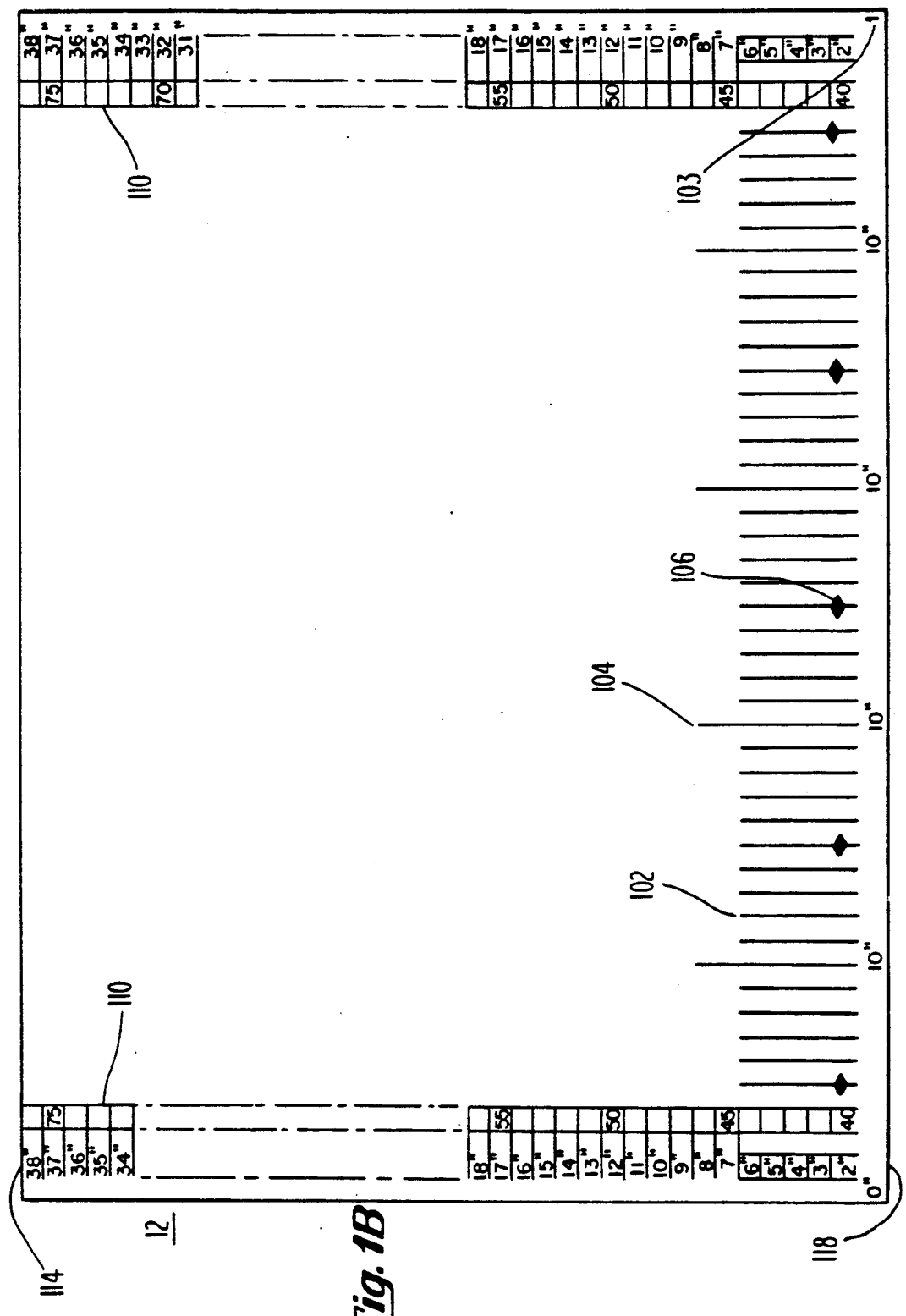
Figure 1C:
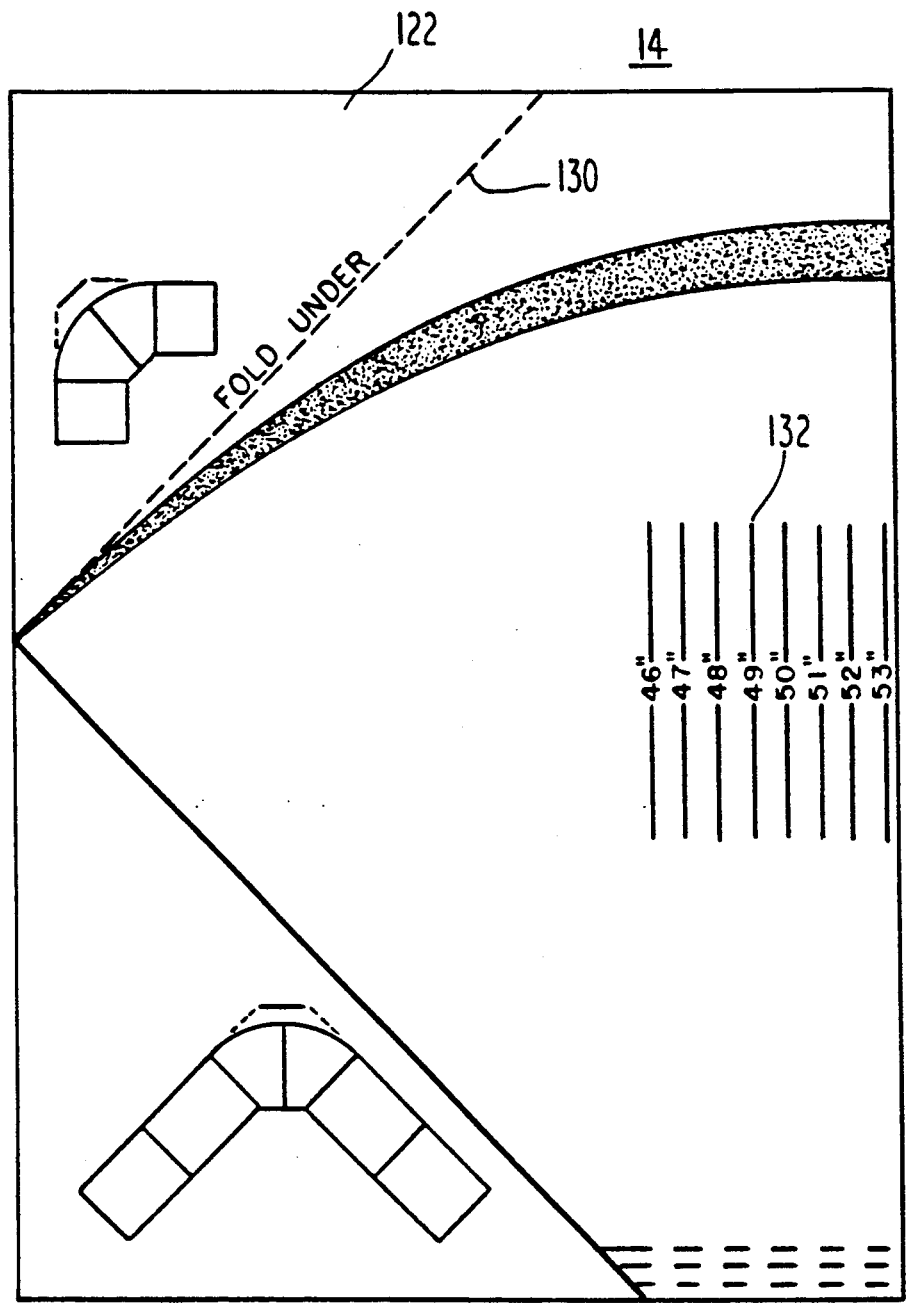
Figure 1D:
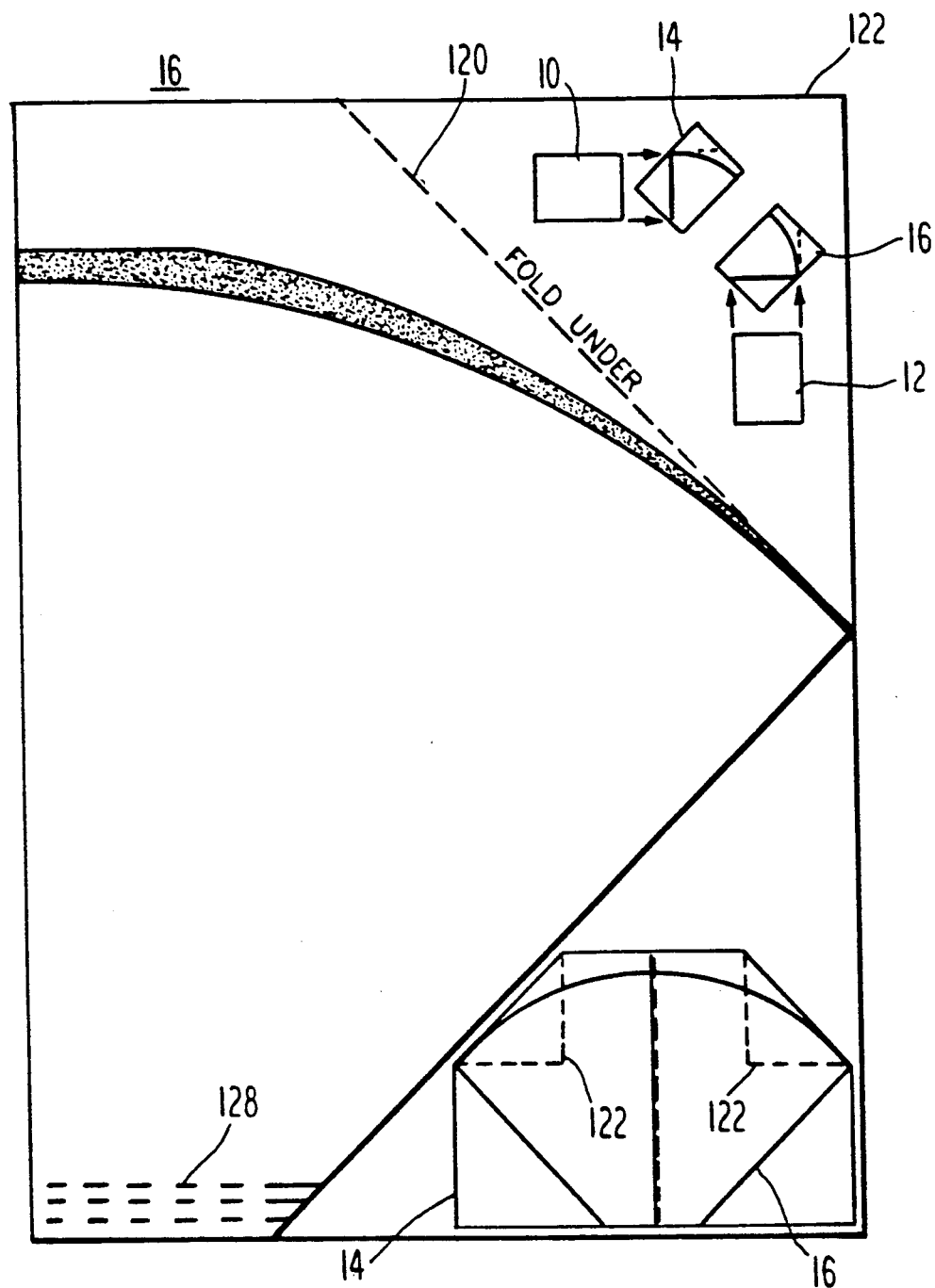

Referring now to FIGS. 1A-1D, there are shown adjustable furniture layouts 10, 12, 14, 16 of the present invention. Adjustable layouts 10, 12, 14 and 16 may be arranged in a region to simulate the sizes and layouts of different types of objects, such as furniture, in a room, thereby representing the object. For example, adjustable layouts 10, 12, 14, 16 may be disposed on a floor of a room. Additionally, layouts 10, 12, 14 and 16 may be disposed on a wall to simulate pictures and mirrors and the like. Adjustable layouts 10, 12, 14 and 16 are either foldably adjustable or adjustable by positioning one adjustable layout 10, 12, 14, 16 over another such that a combination of adjustable layouts 10, 12, 14 and 16 extends over an area of predetermined dimensions wherein the combined area of layouts 10,12,14,16 is adjusted according to the dimensions of the object being represented. Additionally, adjustable layouts 10,12,14,16 may be cut or provided with perforations for adjusting the dimensions.

FIGS. 2A-E illustrate various combinations of layouts 10, 12, 14 and 16. For example, in FIG. 2A, wherein the longitudinal dimension of layouts 10, 12 each represent a distance of fifty inches and the shorter dimension of layouts 10, 12 represents a distance of thirty-eight inches, then layout 12 can be disposed overlaying a portion of layout 10 to form layout combination 20 representing a sofa having dimensions of seventy-two inches in length and thirty-eight inches in depth In the case of layout combination 20, twenty-two inches of layout 10 extend outwardly beyond the edge of layout 12. Alternately, layout 10 may be folded until it has dimensions of twenty-two inches by thirty-eight inches and the resulting folded layout 10 may be positioned beside layout 12 layouts 10, 12 can be positioned side by side, unfolded, with neither layout 10, 12, extending over the other layout 10, 12 to form combination 22 representing a sofa having dimensions of one hundred inches by thirty-eight inches. The thirty eight inch dimension can be folded so that the shorter dimension can be shortened.

Figure 2A:
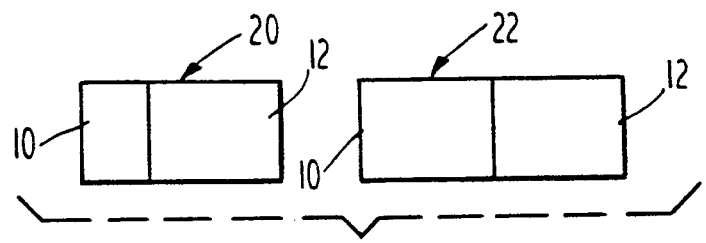
FIGS. 2A-2E show combinations of the layouts of FIG. 1 wherein the combinations represent a plurality of object dimensions.
Figure 2B:
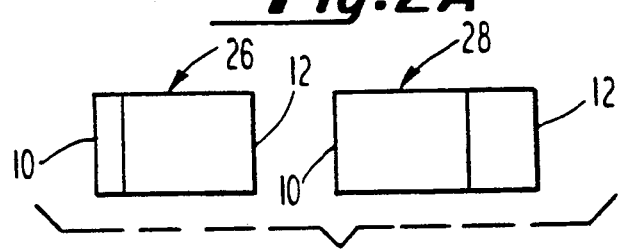

Referring now to FIG. 2B, if the longitudinal dimension of layouts 10, 12 again each represent a distance of fifty inches and the shorter dimension of layouts 10, 12 represents a dimension of thirty-eight inches as previously described, then layout 12 can be disposed over a portion of layout 10 to form layout combination 26 representing a loveseat having dimensions of fifty-one inches in length and thirty-eight inches in depth. In this case, one inch of layout 10 extends outwardly beyond the edge of layout 12. Layout 26 extends to the left, layout 28 extends to the right. Alternately, layout 10 may be folded or cut until it has dimensions of one inch by thirty-eight inches and the resulting folded layout 10 may be positioned beside layout 12. Layouts 10, 12 can also be positioned side by side, unfolded, with layout lo extending over layout 12 to form layout combination 28 representing a sofa having dimensions of seventy-two inches by thirty-eight inches. The thirty eight inch dimension can be folded to nineteen inches.

Figure 2C:
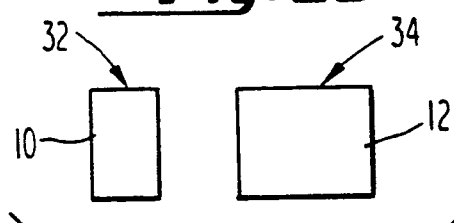

Referring now to FIG. 2C, there are shown combinations 32, 34. By folding or cutting layout 10, layout combination 32, representing for example an end table having dimensions of twenty-five inches by twenty-two inches may be formed. Layout 10 may represent, for example, a chair having dimensions of twenty-five inches in length and thirty-eight inches in depth. By disposing layout 12 in a region without any folding or cutting of layout 12, layout combination 34 may be formed. By thus disposing layout 12 in this region, a spatial relationship between layout 12 and the region is determined according to the location within the region at which layout 12 is disposed. Layout combination 34 thus may represent a chair having dimensions of fifty inches in length by thirty-eight inches in depth. The depth is adjustable. Thus layouts 10, 12 may represent chairs having lengths between twenty-five inches and fifty inches while having a depth of thirty-eight inches or thirty-seven inches.

Figure 2D:
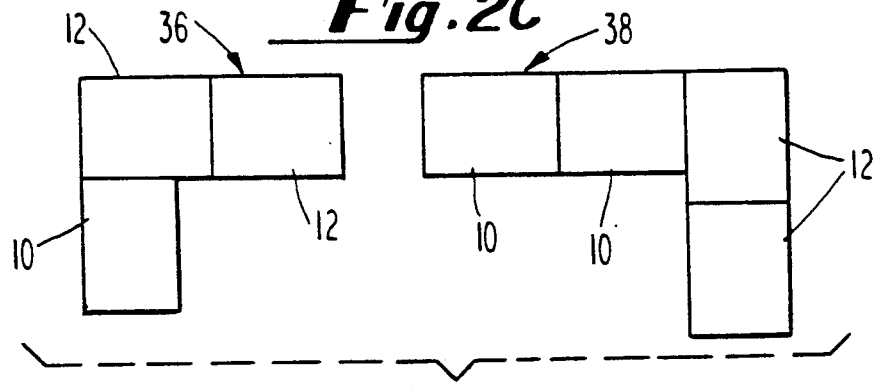

Referring now to FIG. 2D there are shown layout combinations 36, 38 which may represent sectionals ranging in size from eighty-four inches by ninety-six inches for layout combination 36 to one hundred thirty-three inches by one hundred inches for combination 38 Layout combination 36 is formed of layout 10 plus two layouts 12. In an alternate embodiment (not shown) layout combination 36 may be formed of two layouts 10 and one layout 12. To form layout combinations (not shown) having dimensions intermediate the dimensions of layout combination 36 and layout combination 38, portions of layouts 10, 12 of layout combination 38 may overlay each other or may be folded or cut away.

Figure 2E:
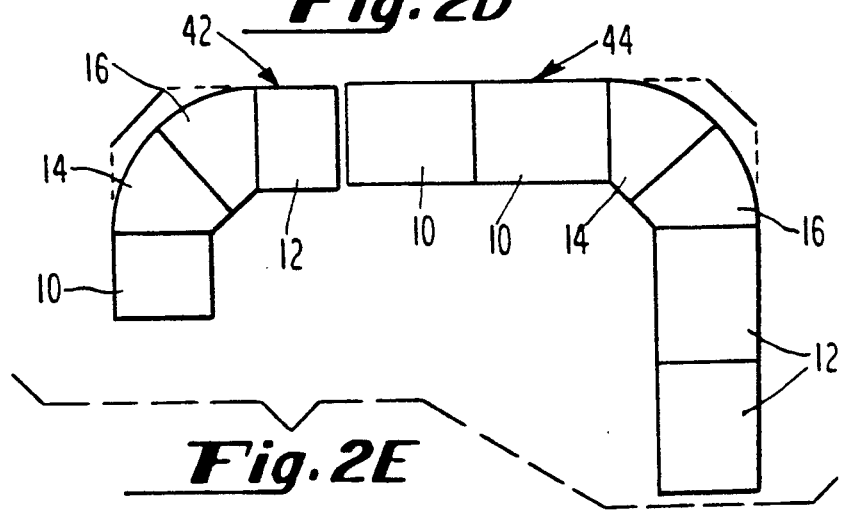

Referring now to FIG. 2E, there are shown layouts representative of sofas and loveseats wherein layouts 14, 16 provide representations of curved sections. Within both layout combination 42 and layout combination 44, layouts 14, 16 make up curved sections. Within layout combination 44 two layouts. 10 may make up one armless sofa or armless loveseat or one arm sofa or one arm loveseat and two layouts 12 may make up another one arm sofa or one arm loveseat. Flaps 122 may be folded along fold lines 120, 130 in order to dispose flaps 122 underneath the remainder of layouts 14, 16. Layouts 14, 16 may be adjusted in size in accordance with indicia 128, 132 and may form sections having dimensions, for example, between forty-two inches and fifty-three inches as shown in FIG. 2F.

Figure 3:
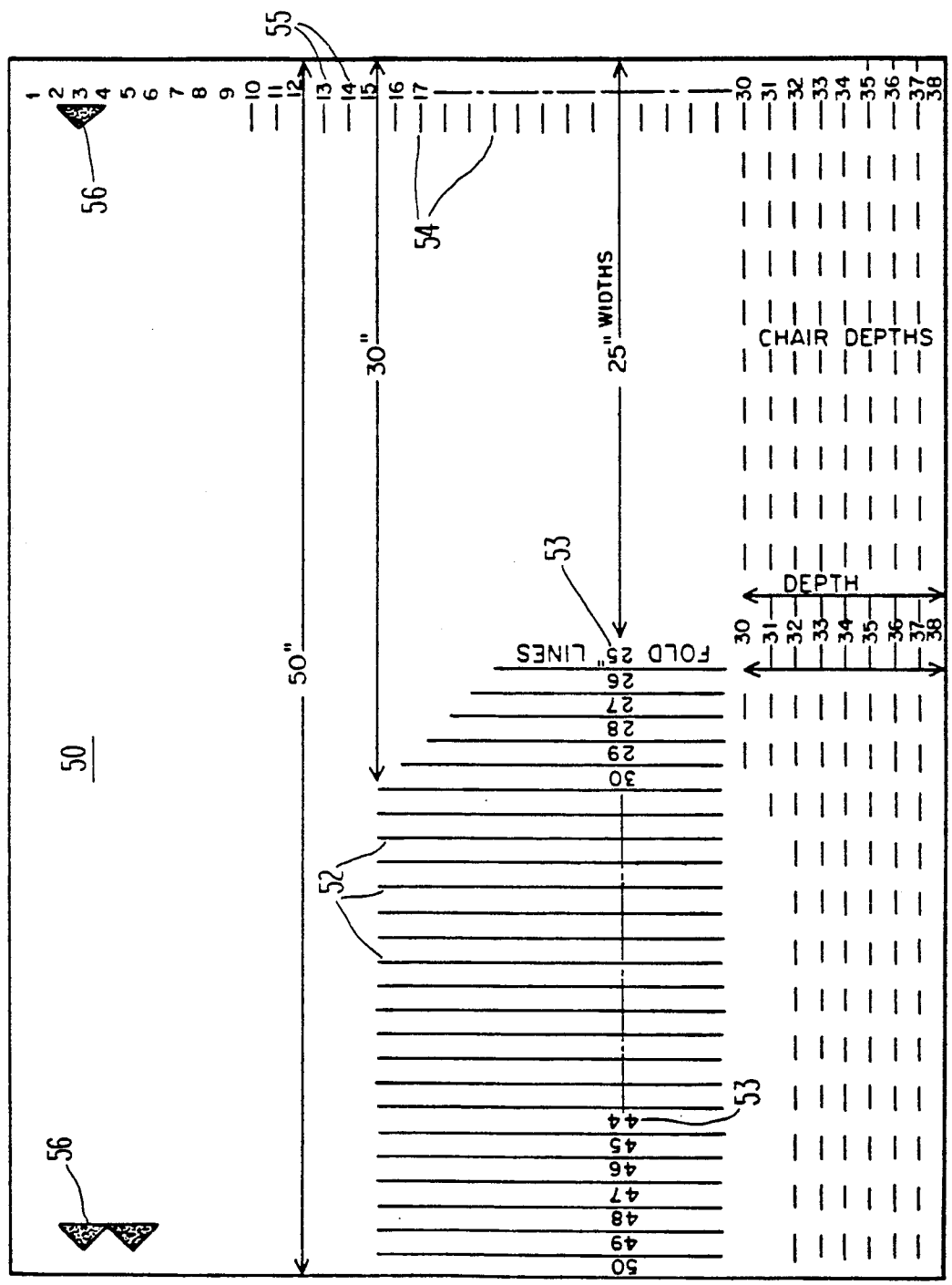
FIG. 3 shows an adjustable layout of FIGS. 1A-1B provided with alternate indicia for adjusting the dimensions of the layout.

Referring now to FIG. 3, there is shown overlay 50 having indicia for assisting a user in adjusting the dimensions of a layout combination including layout 50. A series of fold lines 52 are provided for permitting the longitudinal dimension of layout 50 to be adjusted Each fold line 52 is provided with a numerical indicia 53 for indicating the length of the object represented by layout 50, in inches, when layout 50 is folded a selected fold line 52. Likewise, the perpendicular dimension of layout 50 is provided with fold lines 54 and numerical indicia 55 for indicating the depth of an object represented by layout 50 when a selected fold line 54 is used. Additionally, numerical indicia 53 of fold lines 52, 54 indicate the number of inches beyond a second layout (not shown) in combination with overlay 50 when such a second overlay is disposed upon overlay 50 in a manner which allows overlay 50 to extend beyond such a second overlay. Additionally, overlay 50 is provided with indicia 56 for assisting in the lining up of a plurality of differing overlays 50 as shown in FIG. 2E.

In the preferred embodiment of the present invention, overlays 10, 12 are provided with indicia 102 along a longitudinal edge of overlays 10, 12. For example, if overlays 10, 12 have a longitudinal dimension fifty inches, then, overlays 10, 12 may be provided with markers 102 indicating each of the fifty inches. Additionally, every ten inches, indicia 104, extending outwardly beyond the ends of indicia 102 is provided in order to permit every tenth indicia 104 to be readily located. Numerical indicia 101 are associated with indicia 104 to indicate every tenth indicia 102. When overlays 10, 12 are disposed together numerical indicia 103 from different overlays may combine to form indicia 101. Intermediate each pair of indicia 104 and intermediate outermost indicia 104 and the parallel edges of layouts 10, 12 there is provided diamond marker 106 in order to permit the intermediate position to be more readily located.

Indicia 100 are provided along the edges of layouts 10, 12 in the direction perpendicular to the longitudinal edges of layouts 10, 12, for example along edge 116. Indicia 100 in the preferred embodiment each indicate a distance of one inch wherein thirty-eight different indicia 100 are provided to indicate a dimension of thirty-eight inches. Indicia 100 may be for the purpose of folding.

Figure 4:
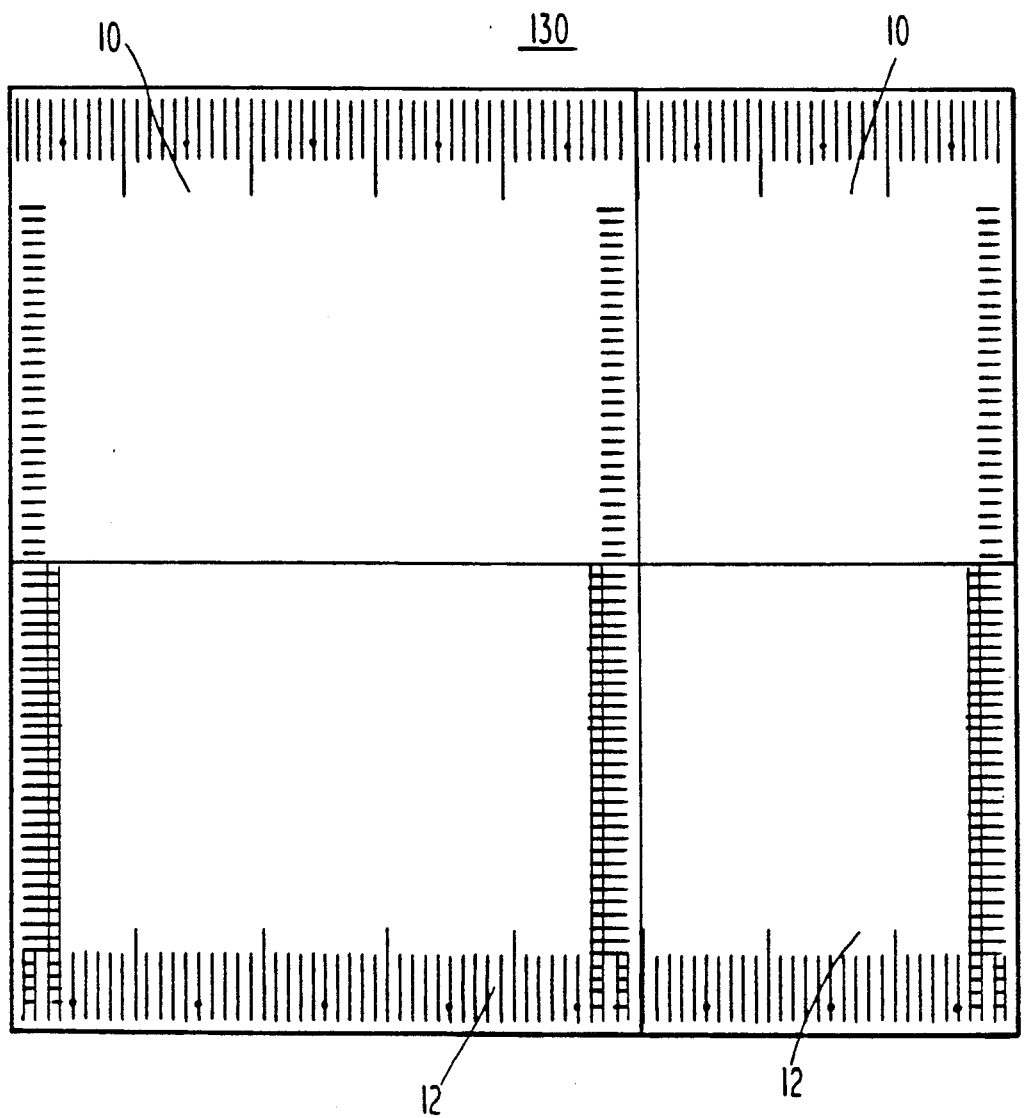
FIG. 4 shows a combination of the layouts of FIG. 1A and 1B.

Layout 12 is also provided with metering scales 110 wherein the total length of a layout combination wherein layout 10 is disposed over a portion of 12. For example, if edge 112 of layout 10 is lifted and moved over edge 114 of layout 12 and lowered upon a region of layout 12 intermediate edges 114, 118 of layout 12, scale 110 is read to indicate the total distance between edges 118 of layout 12 and edge of 120 of layout 10 thereby eliminating the need to perform an addition of the indicia on the individual layouts 10, 12. For example, FIG. 4 shows a layout combination 130 wherein two layouts 10 and two layouts 12 are combined in an overlaying relationship to represent an object having, for example, dimensions of seventy-six inches by eighty inches.

Figure 5:
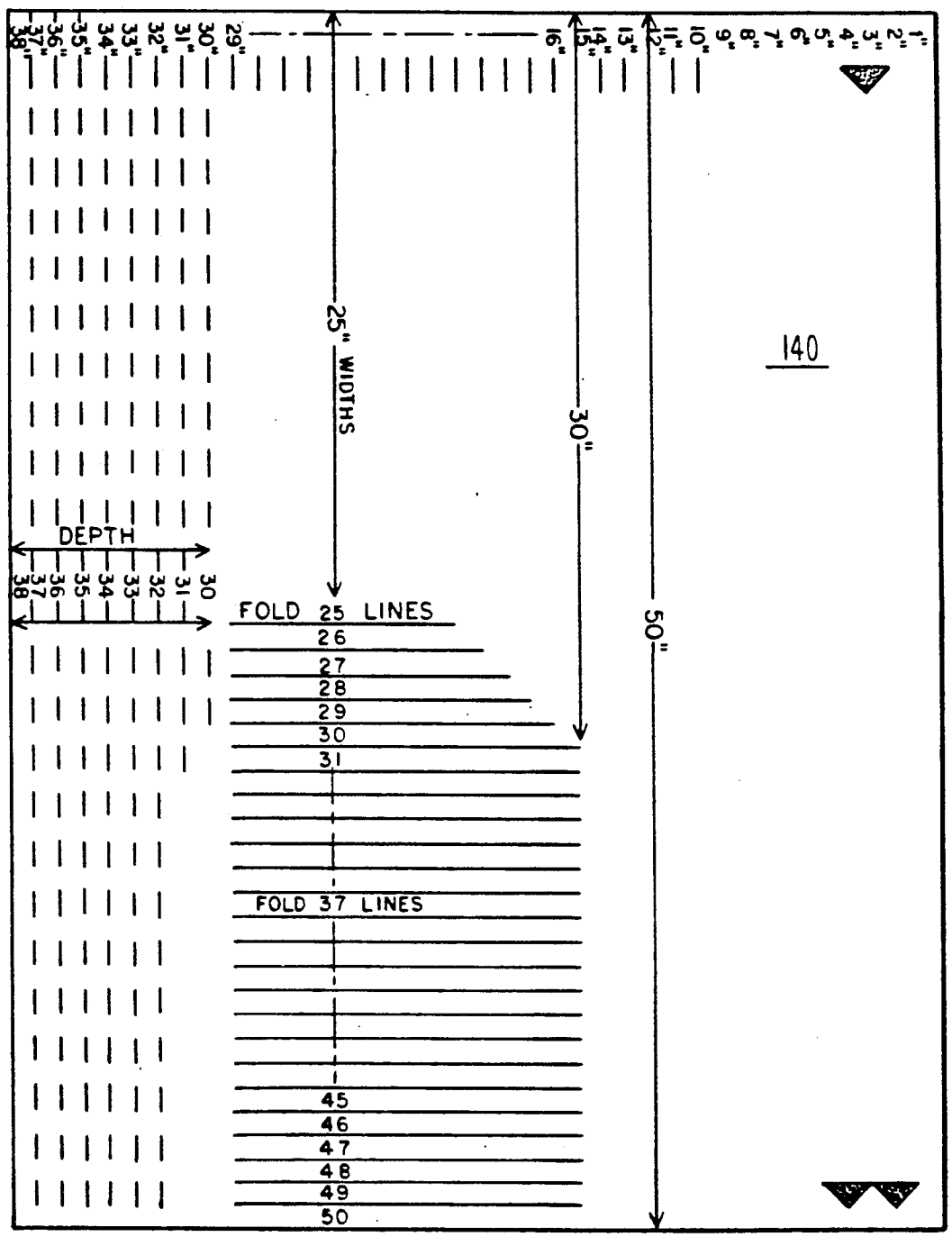
FIG. 5 shows the reverse side of a layout of FIGS. 1A and 1B.

Referring now to FIG. 5 there is shown rear 140 of a layout such as layout 10 or layout 12 wherein rear 140 of layout 10 or layout 12 is provided with a plurality of further indicia for further assisting the user in adjusting the combined layout area in accordance with the object being represented. The length can be continued by using additional layouts 10 and 12. That is the preferred embodiment.

The layouts of the present invention may be formed of plastic, cardboard or paper. All layouts 10, 12, 14, 16 may be formed in uniform dimensions to assist in packaging.

While this invention has been described with reference to specific embodiments thereof, it is not limited thereto. Instead, the claims which follow are intended to be construed to encompass not only the forms and embodiments of the invention shown and described, but also such other forms and embodiments and such variance and modifications thereof as may be devised by those skilled in the art without departing from the true spirit and scope of the present invention as may be ascertained from the foregoing description and accompanying drawings. Thus it is anticipated that aspects of the invention, other than those specifically described and illustrated will be apparent from the foregoing description and the drawings, and many other variants of the invention may be devised.

I claim:

1. A layout for planning the design of a region and the positioning of an object within said region, comprising:
    first layout means for disposing said first layout means in said region to represent placement of said object within said region in a predetermined spatial relationship with said region;
    second layout means for disposing said second layout means in a substantially adjoining relationship with said first layout means to form a layout combination having a combined layout dimension equal to the total length formed by said disposing of said first and second layout means in said adjoining relationship;
    layout indicia disposed upon at least one of said first and second layout means for adjustably disposing said second layout means in said adjoining relationship with said first layout means in a manner adapted to indicate a selected one of said layout indicia; and,
    sequential numerical indicia associated with said layout indicia, said sequential numerical indicia adapted such that the numerical indicia associated with said indicated one of said layout indicia represents said combined layout dimension equal to said total length of said adjoining first and second layout means for adjusting said combined layout dimension in accordance with a dimension of said object to represent said dimension of said object and the positioning of said object within said region.

2. The layout of claim 1, wherein at least one of said first and second layout means disposed in said adjoining relationship with the other of said first and second layout means is adapted to be formed into a folded configuration.

3. The layout of claim 2, wherein said layout adapted to be formed into a folded configuration is further adapted to be folded in accordance with said sequential numerical indicia.

4. The layout of claim 3, wherein at least a selected one of said sequential numerical indicia is adapted to indicate a fold location in accordance with said object dimension and said positioning of said object.

5. The layout of claim 1, wherein at least one of said first and second layout means disposed in said adjoining relationship with the other of said first and second layout means is adapted to be cut in accordance with said sequential numerical indicia.

6. The layout of claim 5, wherein at least a selected one of said sequential numerical indicia is adapted to indicate a cutting location in accordance with said object dimension and said positioning of said object.

7. The layout of claim 1, wherein at least one of said first and second layout means disposed adjoining the other of said first and second layout means is provided with perforations.

8. The layout of claim 7, wherein said layout means provided with perforations is provided with a layout means boundary in accordance with said perforations.

9. The layout of claim 8, wherein said selected perforations for providing said boundary are adapted to be selected in accordance with said object dimension and said positioning of said object within said region.

10. The layout of claim 8, wherein said boundary is defined by said perforations after cutting of said layout means along said perforations.

* * * * *